US 12,175,046 B2

(12) United States Patent
Zhu

(10) Patent No.: US 12,175,046 B2
(45) Date of Patent: Dec. 24, 2024

(54) DISPLAY PANEL AND TOUCH COMPONENT

(71) Applicant: Wuhan China Star Optoelectronics Semiconductor Display Technology Co., Ltd., Hubei (CN)

(72) Inventor: Simin Zhu, Hubei (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 17/419,735

(22) PCT Filed: May 21, 2021

(86) PCT No.: PCT/CN2021/095313
§ 371 (c)(1),
(2) Date: Jun. 30, 2021

(87) PCT Pub. No.: WO2022/241788
PCT Pub. Date: Nov. 24, 2022

(65) Prior Publication Data
US 2024/0036687 A1 Feb. 1, 2024

(30) Foreign Application Priority Data
May 17, 2021 (CN) .................. 202110532740.X

(51) Int. Cl.
*G06F 3/044* (2006.01)
*G06F 3/041* (2006.01)
(52) U.S. Cl.
CPC .......... *G06F 3/0443* (2019.05); *G06F 3/0412* (2013.01); *G06F 3/04164* (2019.05)

(58) Field of Classification Search
CPC .. G06F 3/0443; G06F 3/0412; G06F 3/04164; G06F 2203/04112; G06F 3/0446; G06F 3/0448
See application file for complete search history.

(56) References Cited

U.S. PATENT DOCUMENTS 11,249,608 B2 * 2/2022 Xu ..................... G06F 3/0446
2015/0028894 A1 1/2015 Sleeman
(Continued)

FOREIGN PATENT DOCUMENTS

| CN | 105467691 | 4/2016 |
|----|-----------|--------|
| CN | 108183110 | 6/2018 |

(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali

(57) ABSTRACT

A display panel is provided. The display panel includes: a touch electrode layer including a plurality of touch electrodes, each of the touch electrodes includes a plurality of first grid units; and a touch electrode lead layer including a plurality of touch electrode leads, each of the touch electrode leads includes a plurality of second grid units, and the second grid units are arranged in one-to-one correspondence with the first grid units; wherein ratios of an overlap area between each of the second grid units and a corresponding one of the first grid units to an area of the corresponding first grid unit and to an area of the second grid unit are both less than 1.

18 Claims, 9 Drawing Sheets

(56) References Cited

U.S. PATENT DOCUMENTS

| | | | |
|---|---|---|---|
| 2017/0097700 A1 | 4/2017 | Kim et al. | |
| 2018/0348932 A1* | 12/2018 | Lee | G06F 3/0412 |
| 2019/0064960 A1* | 2/2019 | Na | H10K 77/111 |
| 2020/0183537 A1 | 6/2020 | Sakaue | |
| 2020/0401274 A1* | 12/2020 | Moon | G06F 3/04164 |
| 2022/0035487 A1* | 2/2022 | Wang | G06F 3/0412 |
| 2022/0164070 A1* | 5/2022 | Kim | G06F 3/0448 |
| 2022/0334678 A1* | 10/2022 | Long | G06F 3/0443 |
| 2022/0357816 A1* | 11/2022 | Wen | G09G 3/035 |

FOREIGN PATENT DOCUMENTS

| | | |
|---|---|---|
| CN | 110442255 | 11/2019 |
| CN | 110874160 | 3/2020 |
| CN | 111430439 | 7/2020 |
| CN | 111625121 | 9/2020 |
| CN | 111665995 | 9/2020 |
| CN | 111722761 | 9/2020 |
| TW | I602105 | 10/2017 |

\* cited by examiner

DISPLAY PANEL AND TOUCH COMPONENT

RELATED APPLICATIONS

This application is a National Phase of PCT Patent Application No. PCT/CN2021/095313 having International filing date of May 21, 2021, which claims the benefit of priority of Chinese Patent Application No. 202110532740.X filed on May 17, 2021. The contents of the above applications are all incorporated by reference as if fully set forth herein in their entirety.

FIELD AND BACKGROUND OF THE INVENTION

This application relates to a field of display technology, and in particular to a display panel and a touch component.

Currently, touch display devices are generally formed by integrating a display panel and a touch panel, and the touch panel is used in electronic products such as mobile phones, tablets, and vehicle displays.

FIG. 1 illustrates a schematic cross-sectional view of a conventional touch display device. The conventional touch display device 100 includes a plurality of touch electrodes 101 arranged in a matrix and a touch signal line 102 for connecting the touch electrodes 101 to a touch driver chip. In a case where the touch electrode 101 and the touch signal line 102 are composed of lines of different layers, they are generally separated by an insulating layer 103. The touch electrode 101 and the touch signal line 102 connected thereto are connected one to one by perforating the insulating layer 103 therebetween. However, for the touch electrode 101 that does not need to be electrically connected to the touch signal line 102, when foreign matter appears in the insulating layer 103 between the touch signal line 102 and the touch electrode 101, short circuit is likely to occur between the touch electrode 101 and the touch signal line 102. The short circuit will greatly affect touch performance and cause touch panel to fail to accurately respond to a touch position.

Therefore, it is necessary to propose a technical solution to solve a problem that when the touch signal line and the touch electrode are in different layers, the short circuit is likely to occur and affect an accurate response of the touch position.

The purpose of the present application is to provide a display panel to solve the problem that short circuit between the touch signal line and the touch electrode affects the accurate response of the touch position.

SUMMARY OF THE INVENTION

A display panel, including: a touch electrode layer including a plurality of touch electrodes, wherein each of the touch electrodes includes a plurality of first grid units; and a touch electrode lead layer including a plurality of touch electrode leads, wherein each of the touch electrode leads includes a plurality of second grid units, and the second grid units are arranged in one-to-one correspondence with the first grid units; wherein ratios of an overlap area between each of the second grid units and a corresponding one of the first grid units to an area of the corresponding first grid unit and to an area of the second grid unit are both less than 1.

Compared with traditional technology, the first metal grid and the second metal grid corresponding to the first metal grid exactly coincide completely. In the display panel of the present application, ratios of an overlap area between the second grid unit and a corresponding first grid unit to an area of the corresponding first grid unit and to an area of the second grid unit are both less than 1. This causes the first metal grid and the second metal grid corresponding to the first metal grid to be partially staggered or/and completely staggered to reduce the overlap area between the first metal grid and the second metal grid corresponding to the first metal grid. This further reduces the risk of short circuit between the two, thereby reducing the risk of short circuit between the touch electrode and the touch electrode lead.

DESCRIPTION OF SPECIFIC EMBODIMENTS OF THE INVENTION

The technical solutions in the embodiments of the present application will be clearly and completely described below with reference to the drawings in the embodiments of the present application. Obviously, the embodiments are only a part of the embodiments of the present application, rather than all the embodiments. Based on the embodiments in this application, all other embodiments obtained by those skilled in the art without creative work shall fall within the protection scope of this application.

This application provides a touch component. The touch component includes a touch electrode layer and a touch electrode lead layer. The touch electrode layer includes a plurality of touch electrodes, the touch electrode lead layer includes a plurality of touch electrode leads, and the touch electrodes and the touch electrode leads are electrically connected in one-to-one correspondence. Each touch electrode includes a plurality of first grid units, and each touch electrode lead includes a plurality of second grid units, and the second grid units are arranged in a one-to-one correspondence with the first grid units. Ratios of an overlap area between the second grid unit and a corresponding first grid unit to an area of the corresponding first grid unit and to an area of the second grid unit are both less than 1, to reduce the overlap area between the second grid unit and the corresponding first grid unit. This can further reduce the risk of short circuit between the touch electrode lead and the touch electrode that does not need to be electrically connected to the touch electrode lead.

Wherein, the second grid units are arranged in a one-to-one correspondence with the first grid units means that the second grid unit and the first grid unit are completely staggered, and one of the second grid unit and the first grid unit encircles at least a part of the other, or they are partially overlapped. The ratios of the overlap area between the second grid unit and the corresponding first grid unit to the area of the second grid unit and to the area of the corresponding first grid unit are both less than 1, for example, the ratio is 0.9, 0.8, 0.7, 0.6, 0.5, 0.4, 0.3, 0.2, 0.1, 0.05, or 0. The smaller the ratio, the more beneficial to reduce the risk of short circuit between the touch electrode and the touch electrode lead that does not need to be electrically connected to the touch electrode. The area of the second grid unit and the area of the first grid unit may be the same or different. The ratio of the overlap area between the first grid unit 30111 and the corresponding second grid unit 30211 to the area of the first grid unit 30111 and the ratio of the overlap area between the first grid unit 30111 and the corresponding second grid unit 30211 to the area of the second grid unit 30211 may be different or the same.

Figure 1:
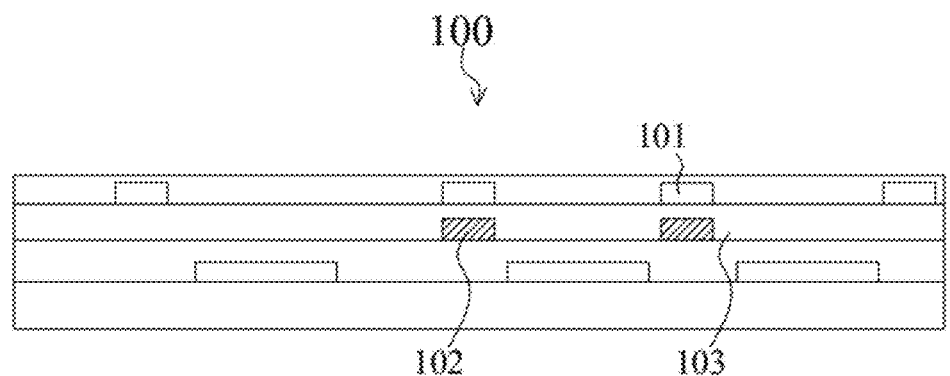
FIG. 1 is a schematic cross-sectional view of a traditional touch display device.
Figure 2:
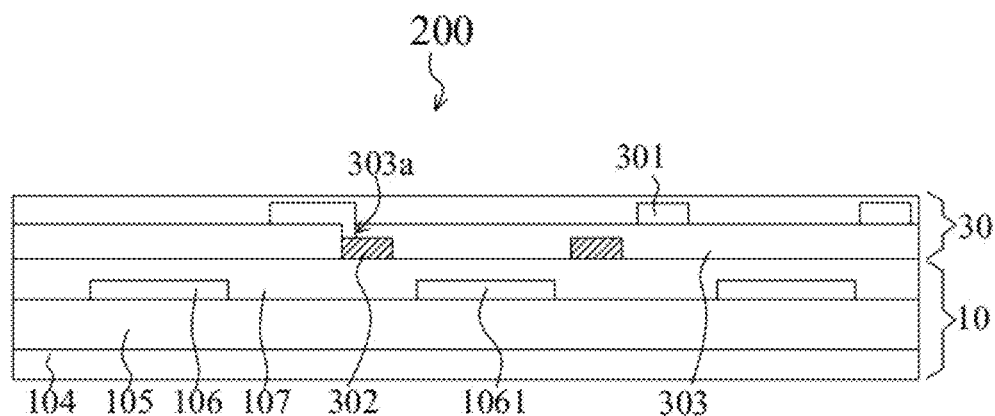
FIG. 2 is a schematic cross-sectional view of a display panel according to an embodiment of the application.
Figure 3:
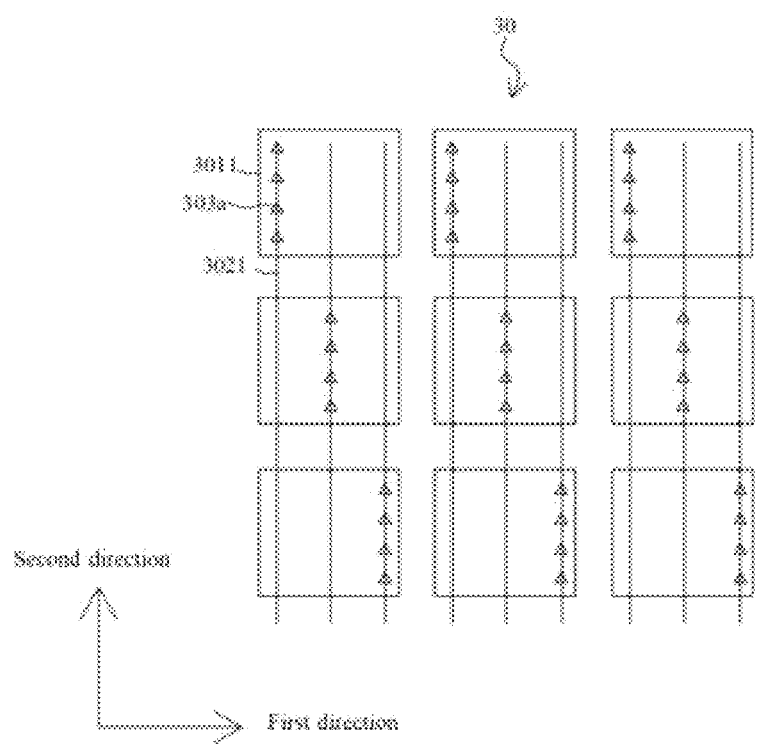
FIG. 3 is a schematic plan view of a touch component shown in FIG. 2.

Please refer to FIG. 2 and FIG. 3. FIG. 2 is a schematic cross-sectional view of a display panel according to an embodiment of the application, and FIG. 3 is a schematic plan view of the touch component shown in FIG. 2. The display panel 200 includes a light-emitting substrate 10 and a touch component 30. The touch component 30 is disposed on a light-emitting side of the light-emitting substrate 10.

In this embodiment, the light-emitting substrate 10 is an organic light-emitting diode display panel, and the light-emitting substrate 10 includes a substrate 104, a thin film transistor array layer 105, an organic light-emitting diode array layer 106, and a thin-film encapsulation layer 107. The substrate 104 is a flexible substrate, the flexible substrate is a polyimide layer, and the substrate 104 may also be a glass substrate. The thin film transistor array layer 105 is disposed on the substrate 104. The thin film transistor array layer 105 includes a plurality of thin film transistors arranged in an array. The organic light-emitting diode array layer 106 is disposed on the thin film transistor array layer 105. The organic light-emitting diode array layer 106 includes a plurality of organic light-emitting diodes. The plurality of organic light-emitting diodes includes red light emitting organic light-emitting diodes, blue light emitting organic light-emitting diodes, and green light emitting organic light-emitting diodes. Each organic light-emitting diode corresponds to a sub-pixel 1061. In this embodiment, the shape of the sub-pixel 1061 may be elliptical, octagonal, or the like. In other embodiments, the shape of the sub-pixel 1061 may also be rectangular, diamond, or the like. The thin film encapsulation layer 107 covers the organic light-emitting diode array layer 106, and the thin film encapsulation layer 107 includes two inorganic layers and an organic layer located between the two inorganic layers. It can be understood that the light-emitting substrate 10 may also be a liquid crystal display panel.

In this embodiment, the touch component 30 includes a touch electrode layer 301, a touch electrode lead layer 302, and an insulating layer 303. The insulating layer 303 is arranged between the touch electrode layer 301 and the touch electrode lead layer 302, and the insulating layer 303 is provided with a plurality of contact holes 303a. The touch electrode lead layer 302 is disposed on the thin film encapsulation layer 107. The insulating layer 303 covers the touch electrode lead layer 302, and the touch electrode layer 301 is disposed on the insulating layer 303. It can be understood that the touch electrode layer 301 can also be disposed on the thin film encapsulation layer 107, and the touch electrode lead layer 302 is disposed on the insulating layer 303. In addition, the touch control component 30 can also be disposed on an independent substrate.

As shown in FIG. 3, the touch electrode layer 301 includes a plurality of touch electrodes 3011 arranged in an array along a first direction and a second direction. The touch electrodes 3011 are self-capacitive touch electrodes. The shape of each touch electrode 3011 is square. Each touch electrode 3011 is composed of a metal grid. Any two touch electrodes 3011 are electrically insulated from each other. The touch electrode lead layer 302 includes a plurality of touch electrode leads 3021, and the plurality of touch electrode leads 3021 are arranged side by side at equal intervals in the first direction and extend in the second direction. Each touch electrode lead 3021 is electrically connected to a corresponding touch electrode 3011 through a contact hole 303a on the insulating layer 303. Each touch electrode lead 3021 includes a metal grid. Wherein, the first direction is different from the second direction. Specifically, the first direction is perpendicular to the second direction.

In this embodiment, as shown in FIG. 4 to FIG. 8, FIG. 10, and FIG. 12. The touch electrode layer 301 includes a plurality of second connection lines 30112, each touch electrode 3011 includes a plurality of first grid units 30111, and the plurality of first grid units 30111 of each touch electrode 3011 are electrically connected by a plurality of second connection lines 30112. The touch electrode lead layer 302 includes a plurality of first connection lines 30212, each touch electrode lead 3021 includes a plurality of second grid units 30211, and each first connection line 30212 connects two adjacent second grid units 30211 in each touch electrode lead 3021. The plurality of second grid units 30211 of each touch electrode lead 3021 and the plurality of first grid units 30111 are arranged in one-to-one correspondence. The shapes of the first grid unit 30111 and the corresponding second grid unit 30211 are the same or similar, where similar means that the shapes of the two tend to be the same. Both the first grid unit 30111 and the second grid unit 30211 are metal grids.

In order to prevent the touch electrode 3011 and the touch electrode lead 3021 from blocking the light emitted by the light-emitting substrate 10, the touch electrode 3011 and the touch electrode lead 3021 are both arranged in the display area and located in the non-luminous area between the adjacent sub-pixels 1061. Specifically, the first grid unit 30111 and the second grid unit 30211 are both arranged around the sub-pixel 1061.

In this embodiment, an orthographic projection of the first grid unit 30111 on the touch electrode lead layer 302 encircles at least a part of a corresponding second grid unit 30211, and/or an orthographic projection of the second grid unit 30211 on the touch electrode layer 301 encircles at least a part of a corresponding first grid unit 30111. Through the enclosing design between the first grid unit 30111 and the second grid unit 30211, they are completely staggered. In this situation, an overlap area between the first grid unit 30111 and the corresponding second grid unit 30211 is equal to 0, and a risk of short circuit between the first grid unit 30111 and the corresponding second grid unit 30211 is small. Alternatively, the first grid unit 30111 and the second grid unit 30211 corresponding to the first grid unit 30111 are partially staggered and partially overlapped so that the first grid unit 30111 and the corresponding second grid unit 30211 are partially overlapped. In this situation, the ratios of the overlap area between the first grid unit 30111 and the corresponding second grid unit 30211 to the area of the first grid unit 30111 and to the area of the second grid unit 30211 are both greater than and less than 1. Compared with traditional technology, the first grid unit and the second grid unit corresponding to the first grid unit exactly coincide completely. The enclosing design and the partial overlap design of the present application can reduce the overlap area between the first grid unit 30111 and the second grid unit 30211 corresponding to the first grid unit 30111. This further reduces the risk of short circuit between the two, thereby reducing the risk of short circuit between the touch electrode 3011 and the touch electrode lead 3021.

Figure 4:
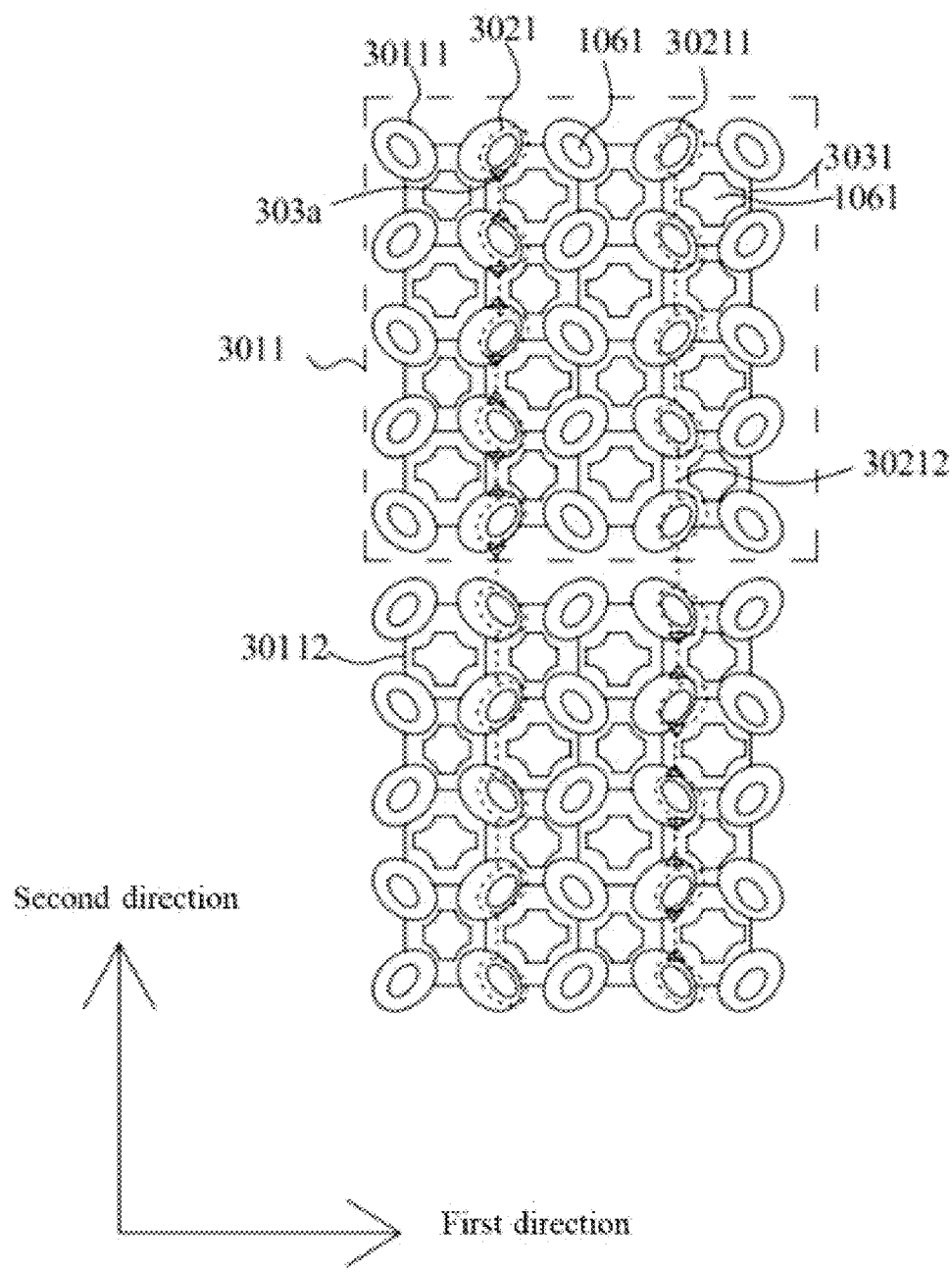
FIG. 4 is a first partially enlarged schematic diagram of the touch component shown in FIG. 3.

As shown in FIG. 4, it is the first partially enlarged schematic diagram of the touch component shown in FIG. 3. The first grid unit 30111 and the second grid unit 30211 are partially overlapped so that the overlap area between the first grid unit 30111 and the corresponding second grid unit 30211 is reduced. This further reduces the risk of short circuit between the touch electrode 3011 and the touch electrode lead 3021.

Specifically, the plurality of second grid units 30211 and the plurality of first grid units 30111 of each touch electrode lead 3021 are partially staggered and partially overlapped in one-to-one correspondence. The second grid unit 30211 has the same shape as the first grid unit 30111. The area of the second grid unit 30211 is smaller than the area of the first grid unit 30111. The ratio of the overlap area between the second grid unit 30211 and the corresponding first grid unit 30111 to the area of the first grid unit 30111 is 0.01. The ratio of the overlap area between the second grid unit 30211 and the corresponding first grid unit 30111 to the area of the second grid unit 30211 is 0.05. Each second grid unit 30211 and the corresponding first grid unit 30111 encircle the same sub-pixel 1061. In addition, some first grid units 30111 independently encircle the sub-pixel 1061. The parts of four adjacent first grid units 30111 in each touch electrode 3011 and the second connection lines 30112 connecting the four adjacent first grid units 30111 form a third grid unit 3031. The area encircled by the third grid unit 3031 is also provided with a sub-pixel 1061. The first grid unit 30111 and the second grid unit 30211 are both closed oval annular patterns, and the third grid unit 3031 is a closed octagonal annular pattern.

As shown in FIG. 5 to FIG. 8, and FIG. 12, an orthographic projection of at least one first grid unit 30111 on the touch electrode lead layer 302 encircles at least a part of a corresponding second grid unit 30211, and/or an orthographic projection of at least one of the second grid units 30211 on the touch electrode layer 301 encircles at least a part of a corresponding first grid unit 30111. By adopting an enclosing design between the first grid unit 30111 and the corresponding second grid unit 30211, the overlap area between them tends to 0 or equal to 0. It is more beneficial to reduce the risk of short circuit between the touch electrode 3011 and the touch electrode lead 3021 that does not need to be electrically connected to the touch electrode 3011.

Figure 5:
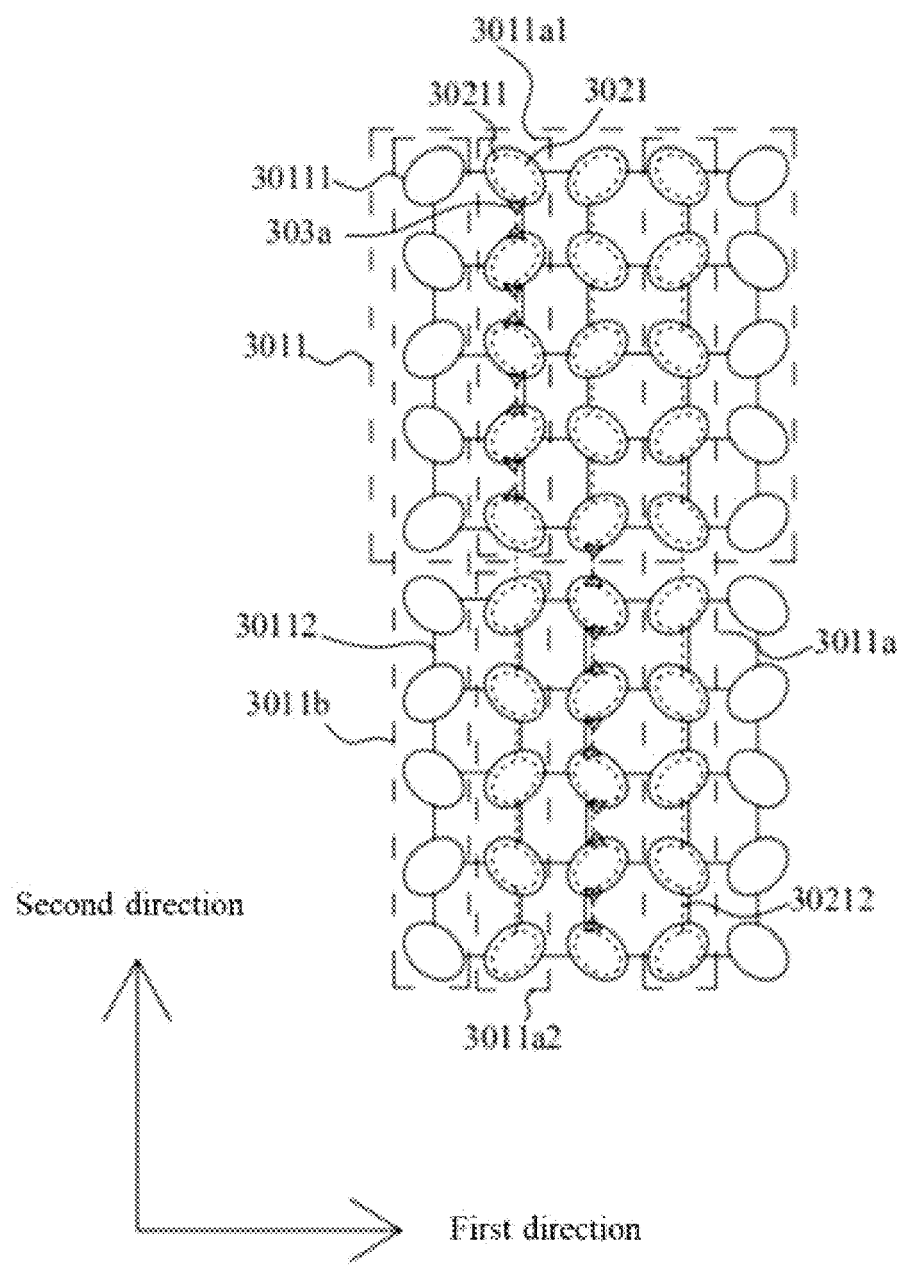
FIG. 5 is a second partially enlarged schematic diagram of the touch component shown in FIG. 3.

As shown in FIG. 5, it is a second partially enlarged schematic diagram of the touch component shown in FIG. 3. The touch electrode layer includes a plurality of first-type first grid unit columns 3011a and a plurality of second-type first grid unit columns 3011b. A plurality of first-type first grid unit columns 3011a and a plurality of second-type first grid unit columns 3011b are arranged side by side and at equal intervals along the first direction. Each first-type first grid unit columns 3011a and each second-type first grid unit columns 3011b include a plurality of first grid units 30111 arranged in the same column along the second direction. Wherein, a plurality of first-type first grid unit columns 3011a and a plurality of touch electrode leads 3021 are arranged in one-to-one correspondence. The orthographic projections of the first grid units 30111 in each first-type first grid unit column 3011a on the touch electrode lead layer 302 encircle the plurality of second grid units 30211 of the corresponding touch electrode lead 3021 one by one, and the first grid unit 30111 encircles the entire corresponding second grid unit 30211. Each second-type first grid unit column 3011b is located on one side of the touch electrode lead 3021 adjacent to the second-type first grid unit column 3011b in the first direction. It can be understood that the touch electrode layer may also only consist of a plurality of first-type first grid unit columns 3011a.

In this embodiment, the number of the second-type first grid unit columns 3011a arranged between two adjacent first-type first grid unit columns 3011a is different from the number of the second-type first grid unit columns 3011b arranged between another two adjacent first-type first grid unit columns 3011a. This leads to differences in the metal distribution of the touch components, resulting in differences in the light emitted by the light-emitting substrate after passing through the touch components. For example, the number of the second-type first grid unit columns between any two adjacent first-type first grid unit columns in part of the first-type first grid unit columns is 0. That is, part of the first-type first grid unit columns 3011a are adjacent and concentrated, which refer to the first-type first grid unit columns are adjacent and concentratedly arranged in the same column of touch electrodes 3011, as shown in FIG. 5, which can also refer to the first-type first grid unit column 3011a is respectively arranged in two adjacent columns of touch electrodes 3011. The number of the second-type first grid unit columns 3011b between any two adjacent first-type first grid unit columns 3011a in some of the first-type first grid unit columns 3011a is greater than or equal to 1. That is, some of the first-type first grid unit columns 3011a are arranged at intervals, some of the first-type first grid unit columns 3011a are arranged adjacently, and some of the first-type first grid unit columns 3011a are arranged at intervals. This makes multiple touch electrode leads 3021 unevenly distributed, which affects the uniformity of the light emitted by the light-emitting substrate 10 after passing through the touch component 30.

In this embodiment, each first-type first grid unit column 3011a includes one first-type first grid unit group 3011a1 and a plurality of second-type first grid unit groups 3011a2. The first-type first grid unit group 3011a1 includes a plurality of adjacent first grid units 30111 located in the area where one touch electrode 3011 is located. The plurality of first grid units 30111 of each first-type of first grid unit group 3011a1 are electrically connected to the touch electrode leads corresponding to the first-type of first grid unit column 3011a. Wherein, the plurality of first grid units 30111 of each first-type first grid unit group 3011a1 are electrically connected with the corresponding second grid units through contact holes on the insulating layer, and the cross-sectional shape of the contact hole 303a is triangular. Each second-type first grid unit group 3011a2 includes a plurality of first grid units 30111 located in the area where one touch electrode 3011 is located. The plurality of first grid units 30111 of each second-type first grid unit group 3011a2 are electrically insulated from the touch electrode leads 3021 corresponding to the first-type first grid unit column 3011a. As shown in FIG. 5, the first grid unit 30111 in the first-type first grid unit group 3011a1 and the first grid unit 30111 in the second-type first grid unit group 3011a2 are both closed oval annular patterns. The area of the first grid unit 30111 in the first-type first grid unit group 3011a1 is equal to the area of the first grid unit 30111 in the second-type first grid unit group 3011a2. In addition, the first grid unit 30111 in the second-type first grid unit column 3011b is a closed oval annular pattern, and its shape and size are the same as the shape and size of the first grid unit 30111 in each first-type first grid unit column 3011a.

In each first-type first grid unit column 3011a, the first grid unit 30111 in the first-type first grid unit group 3011a1 is electrically insulated from the first grid unit 30111 in each second-type first grid unit group 3011a2. In the area where a touch electrode 3011 is located, the first grid unit 30111 in the first-type first grid unit group 3011a1 is electrically connected to the first grid unit 30111 in the second-type first grid unit group 3011a2.

Please continue to refer to FIG. 5. In each touch electrode 3011, any two adjacent first grid units 30111 arranged in the same column in the first direction are connected by a second connection line 30112 in the first direction. Two adjacent first grid units 30111 in each first-type first grid unit group 3011a1 are connected in the second direction by a second connection line 30112, and two adjacent first grid units 30111 in each second-type first grid unit group 3011a2 are also connected in the second direction by a second connection line 30112. That is, a plurality of first grid units 30111 in an area where one touch electrode 3011 is located of the second-type first grid unit column 3011b are connected by the second connection line 30112 in the second direction. Wherein, the second connection lines 30112 connecting two adjacent first grid units 30111 in each second-type first grid unit group 3011a2 correspond to a part of the first connection lines 30212 in a one-to-one correspondence and are staggered to reduce the risk of short circuit between the second connection line 30112 connecting the first grid unit 30111 in the second-type first grid unit group 3011a2 and the corresponding first connection line 30212, and prevent short circuits between the touch electrode leads and the touch electrodes that do not need to be electrically connected through the connection lines.

Figure 6:
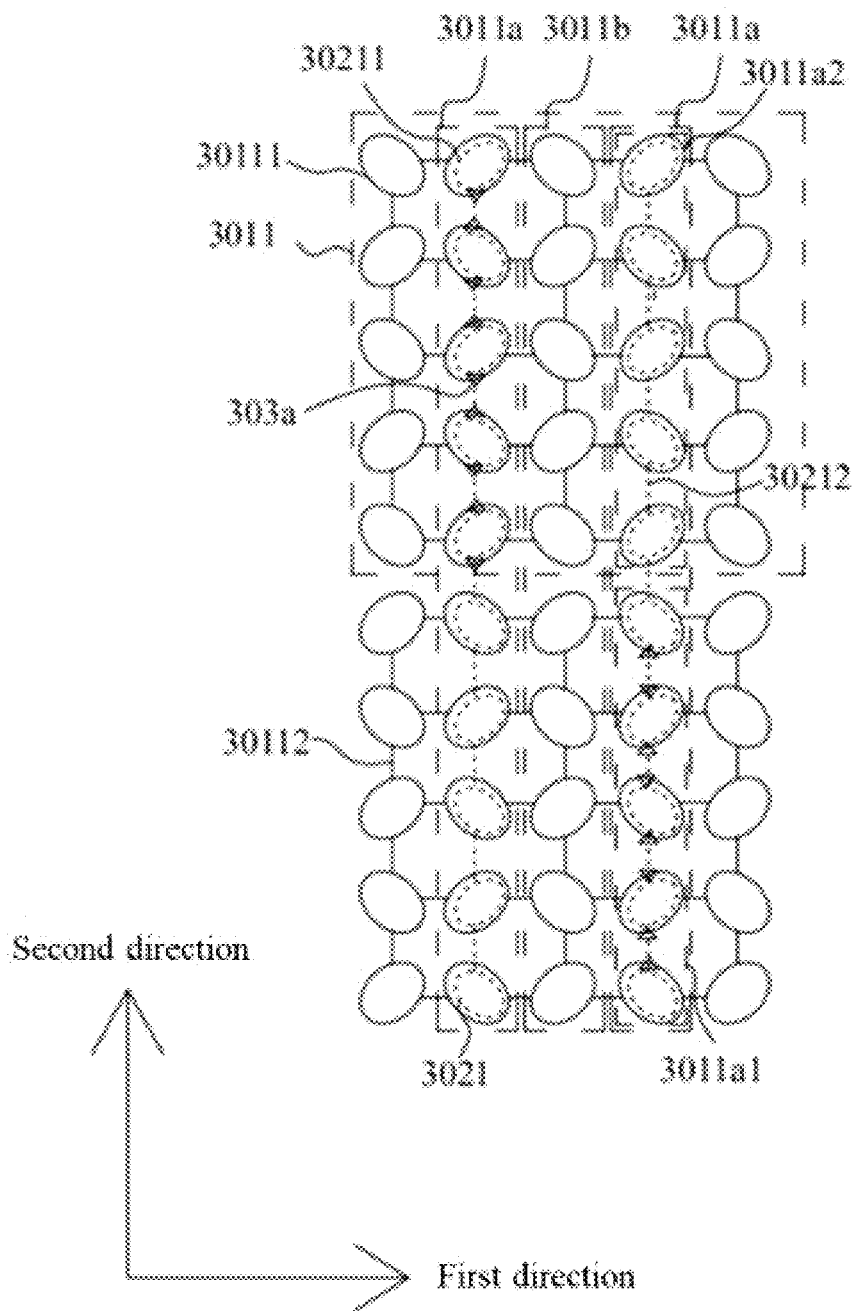
FIG. 6 is a third partially enlarged schematic diagram of the touch component shown in FIG. 3.

As shown in FIG. 6, it is a third partially enlarged schematic diagram of the touch component shown in FIG. 3. The touch component shown in FIG. 6 is basically similar to the touch component shown in FIG. 5. The difference is that the number of the second-type first grid unit columns 3011b arranged between any two adjacent first-type first grid unit columns 3011a are the same and greater than or equal to 1. In some locations, only the second-type first grid unit column 3011b is arranged so that the light transmittance of the touch component 30 is improved. The multiple touch electrode leads 3021 are evenly distributed so that the light emitted by the light-emitting substrate passes through the touch component uniformly, while the light emitted by the light-emitting substrate 10 passing through the touch component 30 has a high transmittance. Specifically, in the same row of touch electrodes 3011 in the second direction, the number of second-type first grid unit columns 3011b arranged between any two adjacent first-type first grid unit columns 3011a are the same and equal to 1.

In addition, as shown in FIG. 6, the area of the first grid unit 30111 in the first-type first grid unit group 3011a1 is equal to the area of the first grid unit 30111 in the second-type first grid unit group 3011a2. In the second direction, no second connection line 30112 is provided between any two adjacent first grid units 30111 in each second-type first grid unit group 3011a2. That is, in the second direction, any two adjacent first grid units 30111 in each second-type first grid unit group 3011a2 are not connected to each other to prevent increasing the risk of short circuit between the second connection line 30112 and the first connection line 30212 due to the provision of a second connection line connecting any two adjacent first grid units in the second-type first grid unit group. Therefore, the risk of short circuit between the touch electrode 3011 and the touch electrode lead 3021 that does not need to be electrically connected to the touch electrode 3011 is reduced. In addition, in each first-type first grid unit group 3011a1, there is no second connection line 30112 disposed between any two adjacent first grid units 30111 in the second direction to reduce the difficulty of manufacturing the first-type first grid unit column 3011a.

It should be noted that, because the touch electrode lead 3021 and the touch electrode 3011 are made of metal, the touch electrode lead 3021 and the touch electrode 3011 have light-shielding properties for the light emitted by the light-emitting substrate 10. The touch electrode leads 3021 and the touch electrodes 3011 are evenly distributed between the sub-pixels 1061, which helps to ensure the uniformity of the light after passing through the touch component 30.

Figure 7:
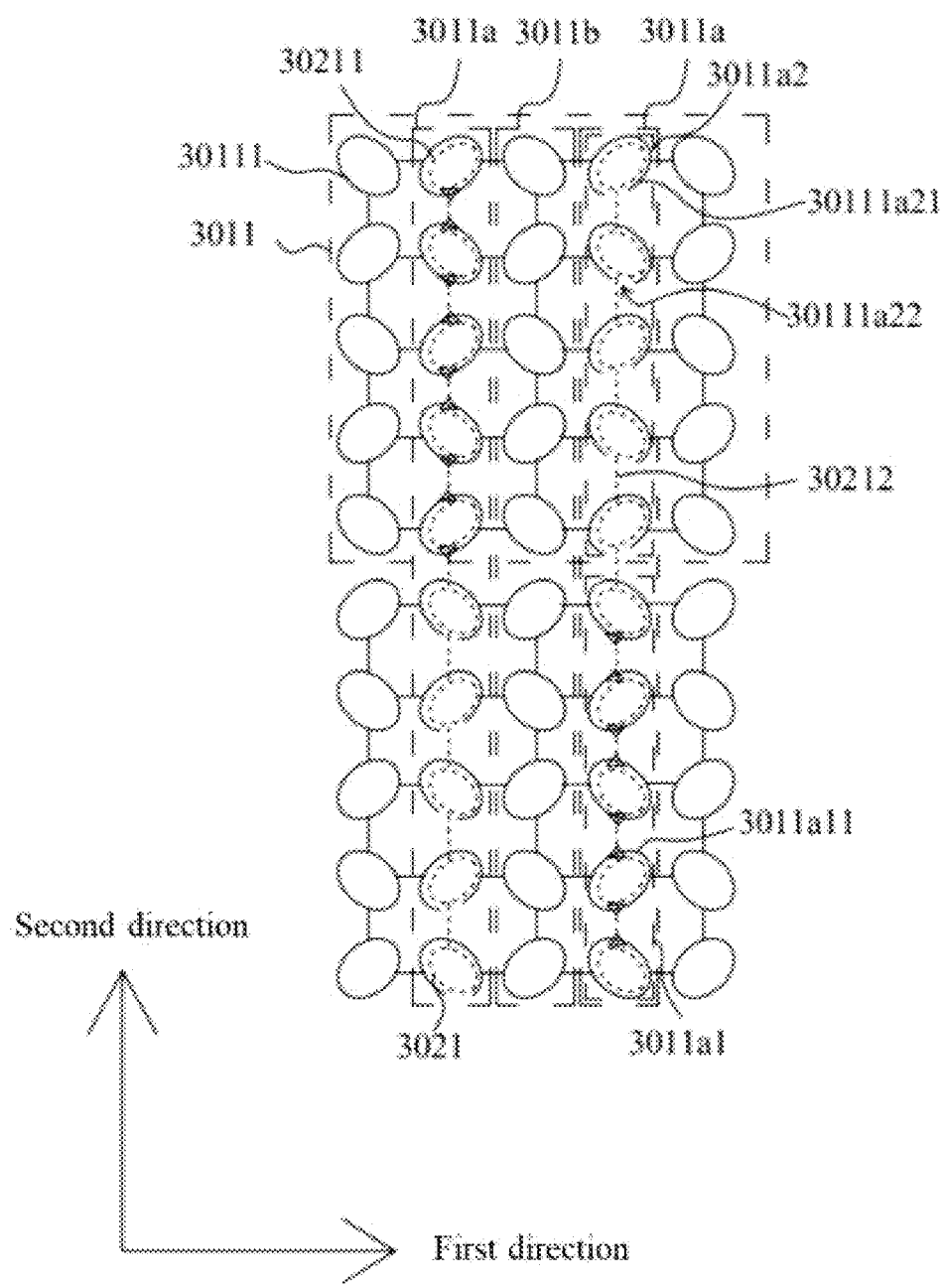
FIG. 7 is a fourth partially enlarged schematic diagram of the touch component shown in FIG. 3.

Please refer to FIG. 7, which is a fourth partially enlarged schematic diagram of the touch component shown in FIG. 3. The touch component shown in FIG. 7 is basically like the touch component shown in FIG. 6. The difference is that the area of the first grid unit 30111 in the first-type first grid unit group 3011a1 is greater than the area of the first grid unit 30111 in the second-type first grid unit group 3011a2 to improve the reliability of the electrical connection between the first grid unit 30111 in the first-type first grid unit group 3011a1 and the corresponding second grid unit 30211 through the contact hole 303a and reduce the probability of electrical connection between the first grid unit in the second-type first grid unit group and the corresponding second grid unit. This ensures the reliability of the electrical connection between the touch electrode and the touch electrode lead that needs to be electrically connected to the touch electrode, while reduces the risk of short circuit between the touch electrode and the touch electrode lead that does not need to be electrically connected to the touch electrode.

Specifically, the first grid unit 30111 in the second-type first grid unit group 3011a2 is composed of a first annular pattern 30111a21 including a disconnect portion 30111a22. The disconnect portion 30111a22 is provided corresponding to the first connection line 30212 connecting two adjacent second grid units 30211 in the touch electrode lead 3021 to reduce the risk of short circuit between the first grid unit 30111 and the first connection line 30212 in the second-type first grid unit group 3011a2. Therefore, the risk of short circuit between the touch electrode and the touch electrode lead that does not need to be electrically connected to the touch electrode is reduced. The first grid unit 30111 in the first-type first grid unit group 3011a1 is composed of a closed second annular pattern 3011a 11. The difference between the second annular pattern 3011a11 and the first annular pattern 30111a21 is only the disconnect portion 30111a22. The ratio of the length of the disconnect portion 30111a22 to the length of the first annular pattern 30111a21 is greater than 0 and less than or equal to 1. For example, the ratio is 0.05, 0.1, 0.2, 0.3, or 0.5.

Figure 8:
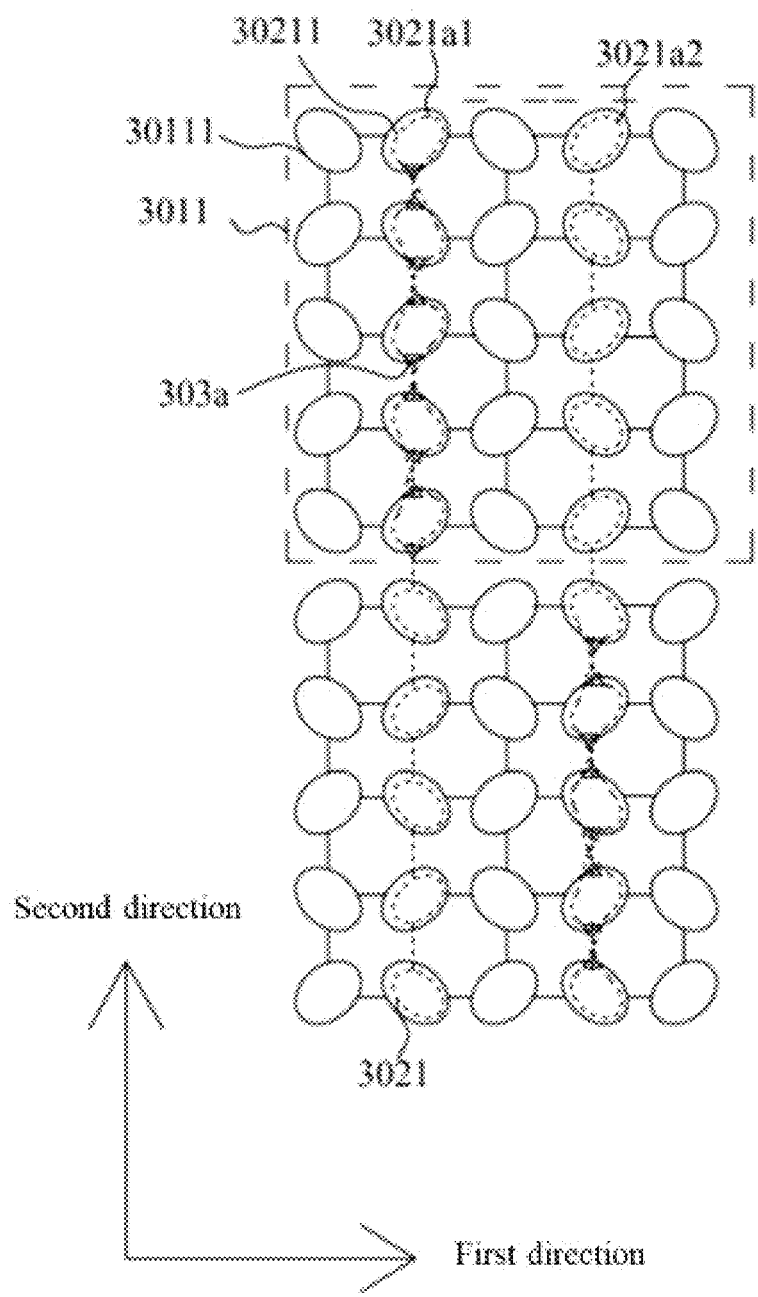
FIG. 8 is a fifth partially enlarged schematic diagram of the touch component shown in FIG. 3.
Figure 9:
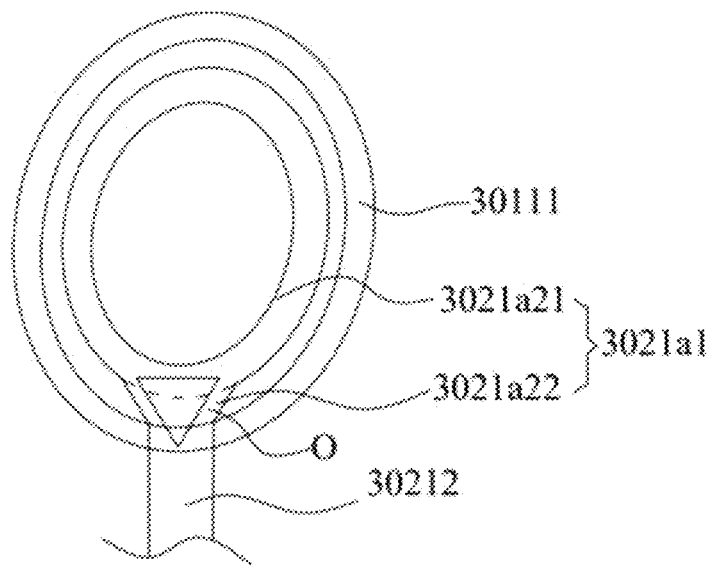
FIG. 9 is a schematic diagram of a first-type second grid unit electrically connected to a corresponding first grid unit through a contact hole.

As shown in FIG. 8 and FIG. 9, FIG. 8 is a fifth partially enlarged schematic diagram of the touch component shown in FIG. 3. FIG. 9 is a schematic diagram of a first-type second grid unit electrically connected to a corresponding first grid unit through a contact hole. Each touch electrode lead 3021 includes a plurality of adjacent first-type second grid units 3021a1 and a plurality of second-type second grid units 3021a2. Wherein, the first-type second grid unit 3021a1 is provided corresponding to one touch electrode 3011, and is electrically connected to a corresponding first grid unit 30111. The plurality of second-type second grid units 3021a2 are electrically insulated from the corresponding first grid unit 30111. The area of the first-type second grid unit 3021a1 is greater than or equal to the area of the second-type second grid unit 3021a2.

Specifically, the area of the first-type second grid unit 3021a1 is greater than the area of the second-type second grid unit 3021a2. This ensures the reliability of the electrical connection between the touch electrode and the touch electrode lead that needs to be electrically connected to the touch electrode. The first-type second grid unit 3021a1 is composed of a closed third annular pattern 3021a21 and a convex pattern 3021a22. The closed third annular pattern 3021a21 has a connection node O. The convex pattern 3021a22 extends from the connection node O of the closed third annular pattern 3021a21 and is connected to the first connection line 30212. The second-type second grid unit 3021a2 is composed of a closed third annular pattern 3021a21. Wherein, the contact hole 303a is provided corresponding to the convex pattern 3021a22. The convex pattern 3021a22 of the first-type second grid unit 3021a1 is in contact with the first grid unit 30111 corresponding to the first-type second grid unit 3021a1 through a contact hole 303a on the insulating layer 303. The third annular pattern 3021a21 is an elliptical annular pattern. The width of the convex pattern 3021a22 close to the first grid unit 30111 is smaller than the width of the convex pattern 3021a22 away from the first grid unit 30111.

It should be noted that, in each of the first-type first grid unit columns 3011a shown in FIG. 6 to FIG. 8, the multiple first grid units 30111 in the area where one touch electrode 3011 is located cancel the second connection lines 30112 in the second direction, which reduces the overlap area between the touch electrode 3011 and the touch electrode lead 3021, and reduces the risk of short circuit between the touch electrode 3011 and the touch electrode lead 3021. In FIG. 5, FIG. 6, and FIG. 8, the first grid unit 30111 all encircles the entire corresponding second grid unit 30211. In FIG. 7, the first grid unit 30111 only encircles a part of the corresponding second grid unit 30211.

Figure 10:
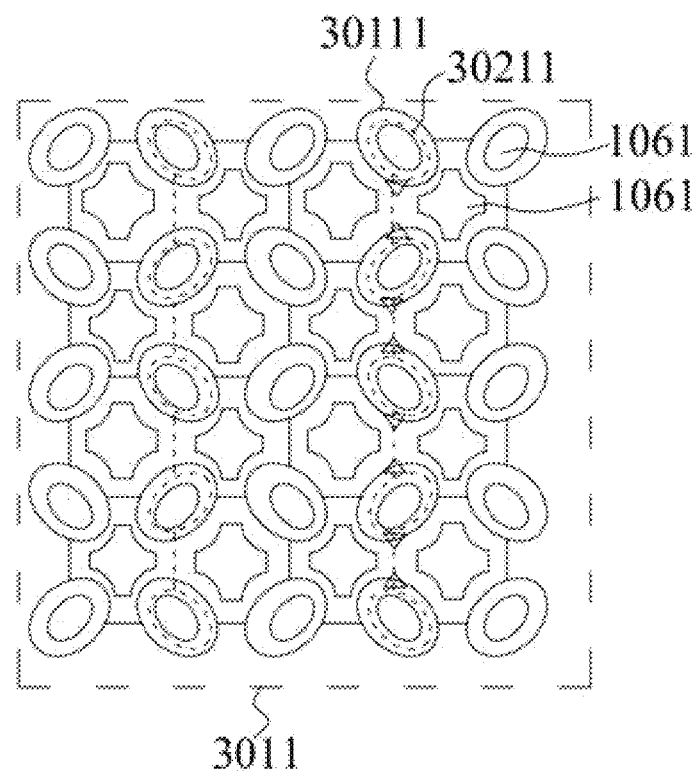
FIG. 10 is a schematic diagram of a first grid unit and a second grid unit encircling sub-pixels.
Figure 11:
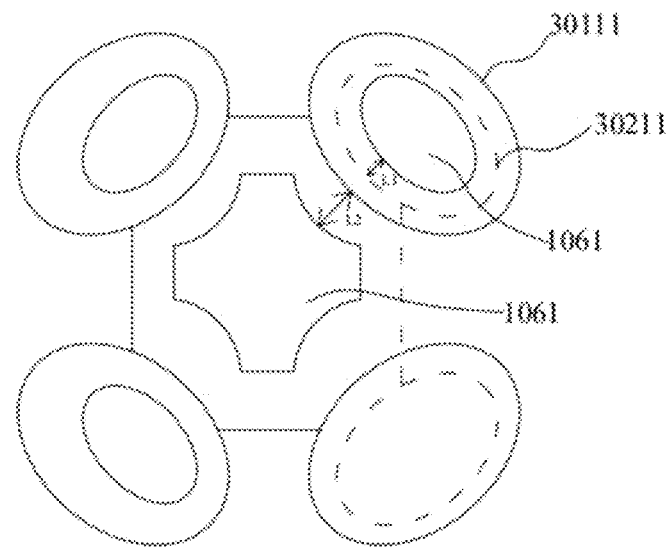
FIG. 11 is a partially enlarged schematic diagram of FIG. 10.

As shown in FIG. 10 and FIG. 11, FIG. 10 is a schematic diagram of a first grid unit and a second grid unit encircling sub-pixels. FIG. 11 is a partially enlarged schematic diagram of FIG. 10. The first grid unit 30111 and the second grid unit 30211 corresponding to the first grid unit 30111 both encircle the same sub-pixel 1061. The distance L2 between the first grid unit 30111 and the sub-pixel 1061 located on a periphery of the first grid unit 30111 and adjacent to the first grid unit 30111 is equal to the distance L1 between the second grid unit 30211 corresponding to the first grid unit 30111 and the sub-pixel 1061 encircled by the second grid unit 30211. This ensures that the distance between the first grid unit and the sub-pixel 1061 and the distance between the second grid unit and the sub-pixel 1061 are the same. It improves the uniformity of the light after passing through the touch component 30. When designing the touch electrode and the touch electrode lead, the distance between the two should be greater than the sum of the manufacturing errors of the touch electrode layer and the touch signal line layer during the manufacturing process to prevent design failure due to manufacturing errors.

Figure 12:
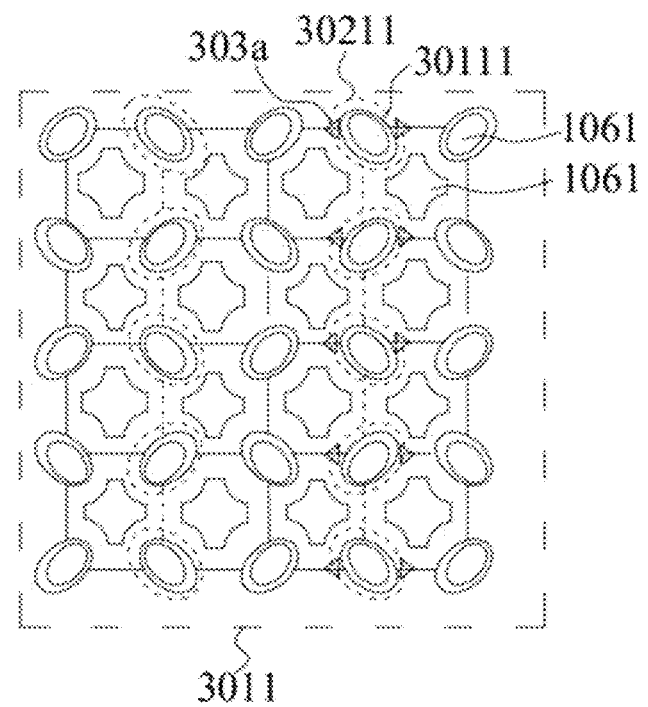
FIG. 12 is a sixth partially enlarged schematic diagram of the touch component shown in FIG. 3.

FIG. 12 is a sixth partially enlarged schematic diagram of the touch component shown in FIG. 3. The orthographic projection of the at least one second grid unit 30211 on the touch electrode layer 301 encircles the at least one first grid unit 30111. Specifically, the orthographic projections of the plurality of the second grid units 30211 of each touch electrode lead 3021 on the touch electrode layer 301 encircle the plurality of first grid unit 30111 of the first-type first grid unit column 3011a corresponding to the touch electrode lead 3021 one by one. Both the first grid unit 30111 and the second grid unit 30211 are closed elliptical annular patterns. In addition, the similarities between the touch component shown in FIG. 12 and the touch component shown in FIG. 6 will not be described in detail here.

It should be noted that the relative position and shape design of the first grid unit 30111 and the second grid unit 30211 shown in FIG. 4 to FIG. 8 and FIG. 12 can be combined with each other, to reduce the risk of short circuit between the first grid unit 30111 and the corresponding second grid unit 30211. This further reduces the risk of short circuit between the touch electrode 3011 and the touch electrode lead 3021 that does not need to be electrically connected to the touch electrode 3011.

The descriptions of the embodiments are only used to help understand the technical solutions and core ideas of this application. Those of ordinary skill in the art should understand that they can modify the technical solutions described in the foregoing embodiments, or equivalently replace some of the technical features. These modifications or replacements do not cause the essence of the corresponding technical solutions to deviate from the scope of the technical solutions of the embodiments of the present application.

What is claimed is:

1. A display panel, comprising:
   a touch electrode layer comprising a plurality of touch electrodes, wherein each of the touch electrodes comprises a plurality of first grid units; and
   a touch electrode lead layer comprising a plurality of touch electrode leads, wherein each of the touch electrode leads comprises a plurality of second grid units, and the second grid units are disposed corresponding to the first grid units;
   wherein ratios of an overlap area between each of the second grid units and a corresponding one of the first grid units to an area of the corresponding one of the first grid units and to an area of a corresponding one of the second grid units are both less than 1;
   the touch electrode lead layer further comprises a plurality of first connection lines, and each of the first connection lines connects two adjacent ones of the second grid units in each of the touch electrode leads; the touch electrode layer further comprises a plurality of second connection lines, and each of the second connection lines connects two adjacent ones of the first grid units in each of the touch electrodes; and
   in a top view, closed shapes of one or more of the first grid units and corresponding one or more of the second grid units are annular, and the one or more of the first grid units at least partially and individually encircles the corresponding one or more of the second grid units.

2. The display panel according to claim 1, wherein an orthographic projection of one of the first grid units on the touch electrode lead layer encircles at least a part of a corresponding one of the second grid units, and/or an orthographic projection of one of the second grid units on the touch electrode layer encircles at least a part of a corresponding one of the first grid units.

3. The display panel according to claim 1, wherein the touch electrode layer comprises a plurality of first-kind first grid unit columns, the first-kind first grid unit columns are arranged side by side along a first direction, each of the first-kind first grid unit columns comprises the first grid units arranged in a same column along a second direction, the first direction is different from the second direction, the touch electrode leads extend along the second direction and are arranged side by side along the first direction, and the touch electrode leads and the touch electrodes are electrically connected in one-to-one correspondence; and
wherein the first-kind first grid unit columns are arranged in one-to-one correspondence with the touch electrode leads, and an orthographic projection of one of the first grid units in each of the first-kind first grid unit columns on the touch electrode lead layer respectively encircles at least a part of one of the second grid units of a corresponding touch electrode lead.

4. The display panel according to claim 3, wherein the touch electrode layer further comprises:
a plurality of second-kind first grid unit columns arranged side by side with the first-kind first grid unit columns in the first direction, and the second-kind first grid unit columns are located on one side of the touch electrode leads in the first direction.

5. The display panel according to claim 4, wherein a number of the second-kind first grid unit columns arranged between two adjacent first-kind first grid unit columns of the first-kind first grid unit columns is different from a number of the second-kind first grid unit columns arranged between another two adjacent first-kind first grid unit columns of the first-kind first grid unit columns.

6. The display panel according to claim 4, wherein numbers of the second-kind first grid unit columns arranged between any two adjacent first-kind first grid unit columns of the first-kind first grid unit columns are same, and the numbers are greater than or equal to 1.

7. The display panel according to claim 4, wherein a plurality of adjacent first grid units of one of the second-kind first grid unit columns in a region where one of the touch electrodes is located are connected to each other in the second direction.

8. The display panel according to claim 3, wherein each of the first-kind first grid unit columns comprises:
a first-kind first grid unit group comprising the first grid units located in a region where one of the touch electrodes is located, wherein the first grid units of the first-kind first grid unit group are electrically connected to a touch electrode lead corresponding to a first-kind first grid unit column; and
a plurality of second-kind first grid unit groups, wherein each of the second-kind first grid unit groups comprises the first grid units located in the region where one of the touch electrodes is located, and the first grid units in each of the second-kind first grid unit groups are electrically insulated from the touch electrode lead corresponding to the first-kind first grid unit column;
wherein an area of the first grid units in each of the first-kind first grid unit groups is greater than or equal to an area of the first grid units in each of the second-kind first grid unit groups.

9. The display panel according to claim 8, wherein the area of the first grid units in the first-kind first grid unit group is greater than an area of at least part of the first grid units in the second-kind first grid unit group, at least part of the first grid units in the second-kind first grid unit group comprises a first annular pattern with a disconnect portion provided corresponding to the first connection lines, and the first grid units in the first-kind first grid unit group comprise a closed second annular pattern.

10. The display panel according to claim 8, wherein the second connection lines connecting two adjacent first grid units of the first grid units in each of the second-kind first grid unit groups correspond to part of the first connection lines in one-to-one correspondence and are staggered from the first connection lines.

11. The display panel according to claim 8, wherein in each second-kind first grid unit group, there is no second connection line provided between any two adjacent first grid units of the first grid units in the second direction.

12. The display panel according to claim 10, wherein in each of the touch electrodes, any two adjacent first grid units of the first grid units arranged in a same column in the first direction are connected by the second connection lines in the first direction.

13. The display panel according to claim 3, wherein the touch electrode leads comprise:
a plurality of adjacent second grid units of the provided corresponding to one of the touch electrodes and electrically connected to corresponding ones of the first grid units; and
a plurality of second-kind second grid units electrically insulated from corresponding ones of the first grid units;
wherein an area of each of the first-kind second grid units is greater than or equal to an area of each of the second-kind second grid units.

14. The display panel according to claim 13, wherein an area of the first-kind second grid units is greater than an area of the second-kind second grid units;
the first-kind second grid units comprise a closed third annular pattern and a convex pattern, the closed third annular pattern comprises a connection node, and the convex pattern extends from the connection node of the closed third annular pattern; and
the second-kind second grid units comprise the closed third annular pattern.

15. The display panel according to claim 14, wherein the convex pattern of the first-kind second grid units is in contact with the first grid units corresponding to the first-kind second grid units.

16. The display panel according to claim 14, further comprising:
an insulating layer disposed between the touch electrode layer and the touch electrode lead layer, wherein a plurality of contact holes are defined in the insulating layer, and each of the contact holes is positioned corresponding to the convex pattern;
wherein each of the touch electrode leads is electrically connected to a corresponding touch electrode through the contact holes.

17. The display panel according to claim 3, further comprising:
a plurality of sub-pixels, wherein the first grid units and the second grid units corresponding to the first grid units both encircle a same sub-pixel.

18. The display panel according to claim 17, wherein a distance between the first grid units and the sub-pixel located on a periphery of the first grid units and adjacent to the first grid units is equal to a distance between the second grid units and the sub-pixel encircled by the second grid units.

* * * * *